Sept. 19, 1950     B. A. KNAUTH ET AL     2,522,520
CONTROL SYSTEM FOR THYRATRONS
Filed March 1, 1948
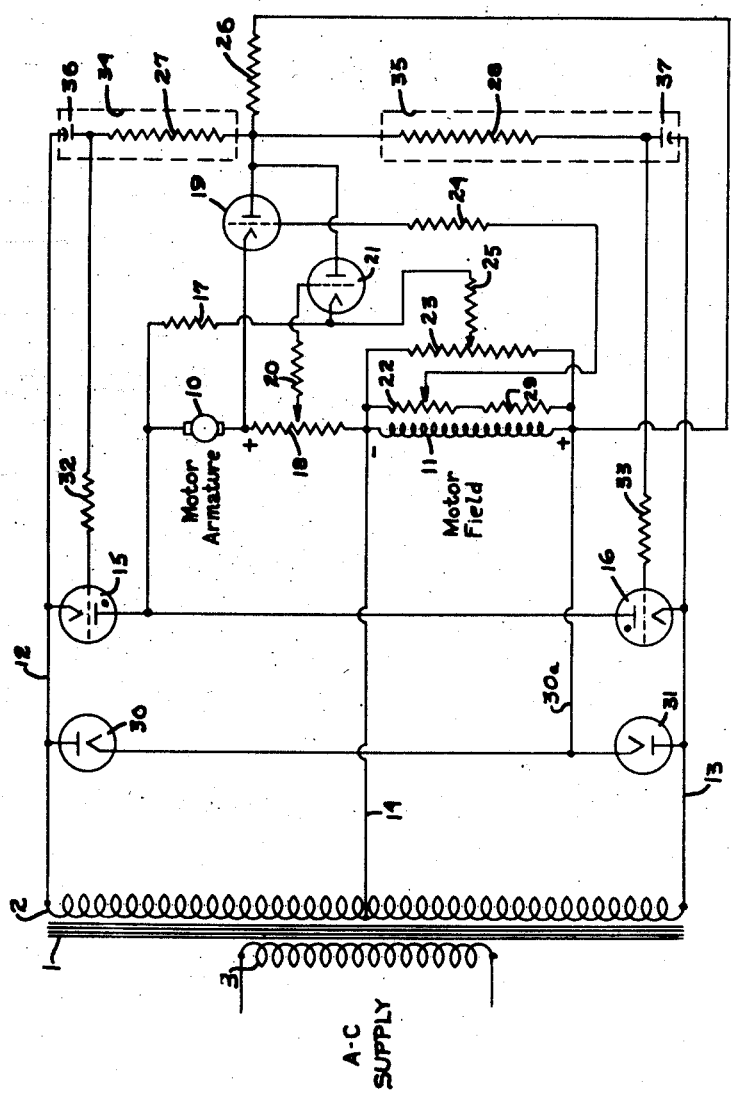
INVENTORS
*BERTHOLD A. KNAUTH*
AND *PAO H. CHIN*
BY
*Semmes, Keegin, Robinson & Semmes*
ATTORNEYS Patented Sept. 19, 1950

2,522,520

UNITED STATES PATENT OFFICE 2,522,520

CONTROL SYSTEM FOR THYRATRONS

Berthold A. Knauth, Bolton, N. Y., and Pao Hsiung Chin, Cranford, N. J., assignors to The Motorspeed Corporation, New York, N. Y.

Application March 1, 1948, Serial No. 12,324

9 Claims. (Cl. 318—345)

Our invention relates to controlling the firing angle of thyratron tubes in which it has many applications, such as arc-welding, resistance welding, servomechanisms, the control of the rate of rotation of electric motors, and other applications which will be apparent from the ensuing description.

While the drawing illustrates the system as applied to the control of the rate of rotation of a direct current motor, it will be apparent that the system has many other applications in industry where similar electrical conditions are desired in operating circuits.

In the particular illustration which we have shown in the drawings, one of the important objects of the invention is to maintain a constant speed, with automatic compensation for change in the load imposed on the motor. A particular use for this system is to maintain a constant speed in, for instance, a pumping mechanism, where the motor may be subjected to varying loads by reason of the change in viscosity of the liquid which is being pumped.

In controlling the firing of thyratron tubes which are grid-controlled gaseous discharge devices that permit the passage of current in only one direction, there are several factors which, in general, effect the firing of the tubes. Control of the output of the tubes can be effected by controlling the firing angle which is dependent on a combination, among others, of the following factors: (1) The grid-to-cathode potential, or grid bias, of the tube as effected by the net instantaneous algebraic sum of the voltage or voltages applied to the grid; (2) the simultaneously occurring anode-to-cathode potential of the tube which is the net instantaneous algebraic sum of all the voltages applied to the anode, which in this instance includes both the alternating supply voltage and the counter-E. M. F. of the motor armature. It is believed to be unnecessary to fully explain the operation of the combination of factors above mentioned. However, it can be stated that we have achieved improvements in the creation and control of these factors over other systems known in the art.

In our system we employ means for generating an adjustable direct potential, which is one component of voltage by which the grids of the thyratron tubes are biased, and which is derived indirectly from the source of alternating current with which the system is supplied; and thus we obtain an adjustable reference voltage without the use of auxiliary equipment.

An object of this invention is to provide an improved thyratron control circuit for controlling direct current motors.

Another object of this invention is to provide an electronic control circuit for controlling direct current motors, the circuit being provided with a pair of thyratrons having the anodes thereof connected together to supply direct current pulses to the armature of the motor.

A further object of this invention is to provide an improved thyratron apparatus for controlling a motor so that as the motor speed and counter-E. M. F. tends to be reduced the current through the armature of the motor is automatically increased.

Still another object of this invention is to provide a control circuit for a motor employing a thyratron and a pair of amplifier tubes, said amplifier tubes being connected to control the firing angle of the thyratron for the purpose of regulating the current through the motor armature in accordance with different load conditions.

Other objects of this invention will be apparent for those skilled in the art to which it relates from the following specification, claims and drawing.

The sole figure of the drawing is a schematic wiring diagram of an embodiment of this invention.

Referring to the drawing there is illustrated a schematic wiring diagram of an electronic motor control circuit in which both the armature 10 and the field 11 of a direct current motor are energized from the alternating current supply lines 12, 13 and 14 connected to the secondary 2 of the transformer 1, the primary 3 of which is connected to a substantially constant potential A. C. supply.

The cathodes of the thyratrons or grid controlled gaseous rectifier tubes 15 and 16 are connected to the alternating current lines 12 and 13, respectively, and the anodes of these grid controlled gaseous rectifiers are connected together and to one of the brushes of the motor armature 10 and the resistor 17.

The other brush of the armature 10 is connected to one of the terminals of the winding of the potentiometer 18 and to the cathode of the amplifier tube 19. The variable contact of the potentiometer 18 is connected to the resistor 20 and through this resistor to the grid of the amplifier tube 21. The other terminal of the winding of the potentiometer 18 is connected to the alternating current line 14 which is connected to the center tap of the transformer secondary 2. This alternating current line 14 is also connected to one terminal of the motor field winding 11 and to one terminal of each of the potentiometers 22 and 23.

The variable contacts of the potentiometers 22 and 23 are connected to the resistors 24 and 25, respectively, and through these resistors 24 and 25 to the grid and cathode of amplifier tubes 19 and 21, respectively. The anodes of the amplifier tubes 19 and 21 are connected together to the junction of the resistors 26, 27 and 28. The potentiometer 22 is connected in series with the resistor 29 across the motor field winding 11 and across the potentiometer 23. The junction of the field winding 11, the resistor 29 and the potentiometer 23 is also connected to the cathodes of the rectifier tubes 30 and 31 and to the resistor 26. The anodes of the rectifier tubes 30 and 31 are connected to the alternating current lines 12 and 13, respectively.

The grid electrodes of the grid controlled rectifiers, or thyratrons, 15 and 16 are connected through grid current limiting resistors 32 and 33, respectively, to the phase shifting networks 34 and 35, respectively. The phase shifting circuit 34 includes the resistor 27 and the capacitor 36 and the phase shifting circuit 35 includes the resistor 28 and the capacitor 37. The resistor 27 is connected in series with the capacitor 36 between the alternating current line 12 and the anodes of the amplifier tubes 19 and 21. Likewise the resistor 28 is connected in series with the capacitor 37 between the alternating current line 13 and the anodes of the amplifier tubes 19 and 21. The junction between the resistor 27 and the capacitor 36 is connected to the grid current limiting resistor 32 of the grid controlled rectifier 15 and the junction between the resistor 28 and the capacitor 37 is connected to the grid current limiting resistor 33 of the grid controlled rectifier 16.

In this circuit the anodes of the thyratrons 15 and 16 are connected together to one brush of the armature 10 of the direct current motor so that this armature may receive unidirectional current pulses during both halves of the alternating current cycle. For example, the armature 10 may be supplied with current pulses when the line 12 is negative with respect to the line 14 and this current pulse will be fed to the motor armature 10 through the thyratron 15. During the next half cycle when the line 13 is negative with respect to the line 14 a current pulse is supplied to the armature 10 through the thyratron 16, and so on. Field current is supplied to the field winding 11 through the rectifier 31 when the line 13 is positive with respect to the line 14 and through the rectifier 30 when the line 12 is positive with respect to the line 14.

This circuit also accomplishes armature-E. M. F. correction so that when the speed of the motor armature 10 tends to be reduced, as when the load is increased, the firing angle of the thyratrons 15 and 16 is advanced to increase the current to the armature through these thyratrons from the alternating current lines. Thus the speed of the armature can be kept at a desired value under increased loads. This is accomplished by controlling the conductivity of the amplifier tube 21 in accordance with the current through the armature 10 by providing grid bias to the grid of the tube 21 from the winding of the potentiometer 18 that is connected in series with the armature 10 and through which armature current flows. When the motor speed is reduced the armature counter-E. M. F. is also reduced and the current through the tube 21 is reduced because the negative grid bias supplied to the grid of the amplifier tube 21 by the counter-E. M. F. of the armature 10 acting through the resistive voltage divider comprising the resistors 17, 25 and 23 relative to that part of resistor 18 between the sliding contactor thereof and the brush of armature 10, is increased. The junction between the resistors 26, 27 and 28 becomes more positive with respect to the line 14 and as a result therefore the firing angle of the thyratrons 15 and 16 is advanced. This compensates for the reduction in the counter-E. M. F. caused by the reduction in speed of the armature.

When the current through the armature 10 is increased the current through the resistor 18 likewise increases and as a result the negative grid bias of the tube 21 is increased, as will be hereinafter described, so that the current through this tube is decreased and this condition also causes the firing angle of the thyratrons 15 and 16 to be advanced so that the circuit functions to compensate for the increased I. R. drop in the armature. This compensated for the increased voltage drop caused by the increase in current in the armature, to maintain the desired speed of the armature with the increased load.

The tube 19 functions to control the thyratron grids to limit the current through the armature 10 when this current is greater than a certain value; this tube acts as a safety device to prevent dangerously excessive currents through the armature. The tube 19 becomes more conductive when the current through the armature 10 exceeds a certain value. This excessive current causes the grid bias of the tube 19 to be less negative and as a result the junction of the resistors 27 and 28 becomes less positive with respect to the line 14 and the firing angle of the thyratrons 15 and 16 is retarded so as to limit the current through the armature 10.

The rectifier tubes 30 and 31, cooperating with the secondary winding 2 supply rectified A. C. to the field winding 11 of the motor as well as the anode currents for the amplifier tubes 19 and 21. Starting at the cathodes of rectifier tubes 30 and 31 it will be seen that current flows through the line 30a to the field winding 11 and out of the field winding to the line 14 into the secondary 2. Considering now the current through the amplifier tube 19 and again starting at the line 30a, current flows through the resistor 26 to the anode of the amplifier tube 19, through the tube to the resistor 18 and to line 14. The anode current of the amplifier tube 21 also flows from line 30a through resistor 26, thence to the anode of amplifier tube 21 to the cathode thereof from which it finds its way back to point 14 via the two paths through resistors 17 and 25.

At least parts of the grid bias potentials for the amplifier tubes 19 and 21 are obtained from the rectifiers 30 and 31 through the use of the potentiometers 22 and 23. Parts of these grid bias potentials are also obtained from the potential drop across the resistor 18 as previously explained. The grid of the tube 19 is therefore, normally positive with respect to the tube's cathode.

While we have shown our system as applied in the control of a direct current motor it will be obvious that the system is useful in many other connections and that the immediate application has been allowed and described merely to allow the invention. We desire that our invention be limited only by the scope of the appended claims and the showing of the prior art.

We claim:

1. A thyratron control system for controlling the current through a direct current motor comprising a thyratron having an anode, a grid and a cathode, a direct current motor having an armature connected in series with said thyratrons across an alternating current supply, means for applying grid potential to said thyratron for firing said thyratron at predetermined points in the alternating current cycle, a resistor connected in series with said armature, a pair of amplifier tubes having the anodes thereof connected to the grid circuit of said thyratron, means for decreasing the conductivity of one of said amplifier tubes when the speed of said motor is reduced or when the current through said armature is increased to cause the firing angle of said thyratron to be advanced and means for increasing the conductivity of the other of said amplifier tubes when the current through said armature exceeds a predetermined value to cause the firing angle of said thyratron to be retarded.

2. A thyratron control system for controlling the current through a direct current motor comprising a pair of thyratrons each having an anode, a grid and a cathode, a direct current motor having an armature connected to the anodes of said thyratrons and to an alternating current supply, means for applying grid potential to said thyratrons for firing said thyratrons at predetermined points in the alternating current cycle, a pair of amplifier tubes having the anodes thereof connected to the grids of said thyratrons and means for decreasing the conductivity of one of said amplifier tubes when the speed of said motor is reduced or when the current through said armature is increased to cause the firing angle of said thyratrons to be advanced and means for increasing the conductivity of the other of said amplifier tubes when the current through said armature exceeds a predetermined value to cause the firing angle of said thyratrons to be retarded.

3. A thyratron control system for controlling the current through a direct current motor comprising a thyratron having an anode, a grid and a cathode, a direct current motor having an armature connected in series with said thyratron across an alternating current supply, means for applying grid potential to said thyratron for firing said thyratron at predetermined points in the alternating current cycle, a pair of amplifier tubes having the anodes thereof connected to the grid of said thyratron and means for decreasing the conductivity of one of said tubes when the speed of said motor is reduced or when the current through said armature is increased to cause the firing angle of said thyratron to be advanced and means for increasing the conductivity of the other of said amplifier tubes when the current through said armature exceeds a predetermined value to cause the firing angle of said thyratron to be retarded.

4. A thyratron control system for controlling the current through a direct current motor comprising a thyratron having an anode, a grid and a cathode, a direct current motor having an armature connected in series with said thyratron across an alternating current supply, means for applying grid potential to said thyratron for firing said thyratron at predetermined points in the alternating current cycle, a resistor connected in series with said armature, an amplifier tube having the anode thereof connected to the grid of said thyratron and means for decreasing the conductivity of said tube when the speed of said motor is reduced or when the current through said armature is increased to cause the firing angle of said thyratron to be advanced.

5. A thyratron control system for controlling the current through a direct current motor comprising a thyratron having an anode, a grid and a cathode, a direct current motor having an armature connected in series with said thyratron across an alternating current supply, means for applying grid potential to said thyratron for firing said thyratron at predetermined points in the alternating current cycle, a resistor connected in series with said armature, said resistor having a variable contact, a pair of vacuum tubes having the anodes thereof connected to the grid of said thyratron and means for decreasing the conductivity of one of said amplifier tubes when the speed of said motor is reduced or when the current through said armature is increased to cause the firing angle of said thyratron to be advanced, connections for connecting the grid of said last mentioned amplifier tube to the variable contact of said resistor, and means for increasing the conductivity of the other of said amplifier tubes when the current through said armature exceeds a predetermined value to cause the firing angle of said thyratron to be retarded.

6. A thyratron control system for controlling the current through a direct current motor comprising a pair of thyratrons each having an anode, a grid and a cathode, a direct current motor having an armature connected to the anodes of said thyratrons across an alternating current supply, means for applying grid potential to said thyratrons for firing said thyratrons at predetermined points in the alternating current cycle, a resistor connected in series with said armature, said resistor having a variable contact, a pair of amplifier tubes having the anodes thereof connected to the grids of said thyratrons and means for decreasing the conductivity of one of said tubes when the speed of said motor is reduced or when the current through said armature is increased to cause the firing angle of said thyratron to be advanced, connections for connecting the grid of said last mentioned amplifier tube to the variable contact of said resistor, and means for increasing the conductivity of the other of said tubes when the current through said armature exceeds a predetermined value to cause the firing angle of said thyratron to be retarded.

7. A thyratron control system for controlling the current through a direct current motor comprising a thyratron having an anode, a grid, and a cathode, a direct current motor having the armature thereof connected in series with the thyratron, an alternating current supply, said armature and thyratron connected across the alternating current supply, a phase shifting circuit connected to the grid of the thyratron and to an alternating current supply, a direct current supply, means including a resistance connecting the direct current supply with the phase shifting circuit to impose a component of the direct current potential on the grid of the thyratron, a first amplifying tube having its anode connected to the phase shifting circuit, a second amplifying tube having its anode connected to the phase shifting circuit, means for decreasing the conductivity of the first amplifying tube as the armature current increases thereby diminishing the potential drop in the means connecting the direct current source with the phase shifting circuit to increase the positive bias on the grids of the thyratron, and means for increasing the conductivity of the second amplifying tube when the armature current exceeds a predetermined value thereby increasing the potential drop in the means connecting the direct current source with the phase shifting system to decrease the positive bias on the grid of the thyratron.

8. A thyratron control system for controlling the current through a direct current motor comprising a thyratron having an anode, a grid, and a cathode, a direct current motor having the armature thereof connected to the thyratron, a resistance connected to the armature of the motor, an alternating current supply, said resistance, motor armature, and thyratron being connected in series across the alternating current supply, a phase shifting circuit connected to the grid of the thyratron, a direct current supply, means including a resistance connecting the direct current supply to the phase shifting circuit, an amplifying tube having its anode connected to the junction of the means connecting the direct current supply with the grid phase shifting system and the phase shifting system, said amplifying tube having its grid connected to the resistance in series with the motor armature and its cathode connected to the negative terminal of the motor armature whereby an increase in torque of the motor will decrease the positive bias of the grid and increase the positive bias of the cathode of the amplifying tube to decrease its conductivity and increase the positive bias of the grid of the thyratron to advance its firing.

9. A thyratron control system for controlling the current through a direct current motor comprising a pair of thyratrons, each thyratron having an anode, a grid, and a cathode, a direct current motor having an armature connected to the anodes of the thyratron, a resistance connected to the positive terminal of the armature, an alternating current supply, a transformer with a center tap connected to the secondary thereof, the cathodes of the thyratrons being connected to the ends of the secondary, said resistance, motor armature and thyratrons being connected in series between the center tap and the ends of the secondary, a pair of rectifiers having their anodes connected to the ends of the secondary of the transformer to provide a direct current supply, a field winding of the motor connected between the cathodes of the rectifiers and the center tap of the secondary, a phase shifting circuit connected to the grids of the thyratrons to introduce an alternating current component in the grid bias, means including a resistance connecting the positive terminal of the field winding with the grid phase shifting circuit, a potentiometer connected across the field winding of the motor, a first amplifying tube having an anode connected to the junction of the means connecting the positive terminal of the field winding with the phase shifting circuit and the phase shifting circuit, said first amplifying tube having a cathode connected to the positive terminal of the motor and a grid connected to the potentiometer, and a second amplifying tube having an anode connected to said junction, a cathode connected to the negative terminal of the motor armature, and a grid connected to the resistance in series with the motor, said first amplifying tube becoming increasingly conductive when the motor armature current exceeds a predetermined value to decrease the positive bias on the thyratron grids by increasing the potential drop in the means connecting the field winding and the phase shifting circuit, and said second amplifying tube becoming less conductive when the armature current increases to increase the positive bias on the thyratron grids.

BERTHOLD A. KNAUTH.
PAO HSIUNG CHIN.

REFERENCES CITED

The following references are of record in the file of this patent:

UNITED STATES PATENTS

| Number | Name | Date |
|---|---|---|
| 2,422,567 | Puchlowski | June 17, 1947 |

---

Certificate of Correction

Patent No. 2,522,520                              September 19, 1950

BERTHOLD A. KNAUTH ET AL.

It is hereby certified that error appears in the printed specification of the above numbered patent requiring correction as follows:

Column 3, line 58, for "armature-E. M. F." read *armature counter E. M. F.*;

and that the said Letters Patent should be read as corrected above, so that the same may conform to the record of the case in the Patent Office.

Signed and sealed this 28th day of November, A. D. 1950.

[SEAL]

THOMAS F. MURPHY,
*Assistant Commissioner of Patents.*